(12) United States Patent
Li et al.

(10) Patent No.: US 9,189,295 B2
(45) Date of Patent: Nov. 17, 2015

(54) GENERATING AN ORDERED SEQUENCE IN A DATABASE SYSTEM USING MULTIPLE INTERLEAVED CACHES

(75) Inventors: Fulu Li, Foster City, CA (US); Chern Yih Cheah, Redwood City, CA (US); Michael Zoll, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 825 days.

(21) Appl. No.: 13/309,356

(22) Filed: Dec. 1, 2011

(65) Prior Publication Data

US 2013/0145096 A1 Jun. 6, 2013

(51) Int. Cl.
*G06F 9/52* (2006.01)
*G06F 17/30* (2006.01)

(52) U.S. Cl.
CPC ............ *G06F 9/52* (2013.01); *G06F 17/30348* (2013.01); *G06F 2209/521* (2013.01)

(58) Field of Classification Search
CPC .......................... G06F 17/30067; G06F 9/5083
USPC ......................................................... 707/782
See application file for complete search history.

(56) References Cited

U.S. PATENT DOCUMENTS

| | | | |
|---|---|---|---|
| 5,784,623 A | 7/1998 | Srinivasan | |
| 7,089,356 B1 * | 8/2006 | Chen et al. ................... | 711/113 |
| 7,103,597 B2 | 9/2006 | McGoveran | |
| 7,136,967 B2 * | 11/2006 | Sawdey ........................ | 711/128 |
| 8,068,114 B2 * | 11/2011 | Andre et al. .................. | 345/541 |
| 8,117,392 B2 * | 2/2012 | Charney et al. .............. | 711/122 |
| 8,626,709 B2 | 1/2014 | Isaacson et al. | |
| 2005/0100017 A1 | 5/2005 | Williams et al. | |
| 2005/0220112 A1 | 10/2005 | Williams et al. | |
| 2006/0101207 A1 * | 5/2006 | Nakazato ...................... | 711/131 |
| 2006/0117212 A1 | 6/2006 | Meyer et al. | |
| 2006/0190453 A1 | 8/2006 | Colrain et al. | |
| 2007/0143766 A1 | 6/2007 | Farchi et al. | |

(Continued)

OTHER PUBLICATIONS

Maurice Herlihy, "Wait-Free Synchronization", ACM Transactions on Programming Languages and Systems, vol. 11, No. 1, Jan. 1991.
Non-final Office Action dated Oct. 25, 2013 for U.S. Appl. No. 13/309,300.
Non-final Office Action dated Jan. 28, 2014 for U.S. Appl. No. 13/627,808.
Final Office Action dated May 22, 2014 for U.S. Appl. No. 13/309,300.

(Continued)

*Primary Examiner* — Rehana Perveen
*Assistant Examiner* — Hicham Skhoun
(74) *Attorney, Agent, or Firm* — Vista IP Law Group, LLP

(57) ABSTRACT

A method, system, and computer program product is disclosed for generating an ordered sequence from a predetermined sequence of symbols using protected interleaved caches, such as semaphore protected interleaved caches. The approach commences by dividing the predetermined sequence of symbols into two or more interleaved caches, then mapping each of the two or more interleaved caches to a particular semaphore of a group of semaphores. The group of semaphores is organized into bytes or machine words for storing the group of semaphores into a shared memory, the shared memory accessible by a plurality of session processes. Protected (serialized) access by the session processes is provided by granting access to one of the two or more interleaved caches only after one of the plurality of session processes performs a semaphore altering read-modify-write operation (e.g., a CAS) on the particular semaphore. The interleaved caches are assigned values successively from the predetermined sequence using a round-robin assignment technique.

20 Claims, 12 Drawing Sheets

(56) References Cited

U.S. PATENT DOCUMENTS

| | | |
|---|---|---|
| 2008/0201523 A1 | 8/2008 | Ash et al. |
| 2008/0244307 A1 | 10/2008 | Dasari et al. |
| 2010/0082540 A1 | 4/2010 | Isaacson et al. |
| 2010/0198920 A1 | 8/2010 | Wong et al. |
| 2010/0250856 A1 | 9/2010 | Owen et al. |
| 2011/0019550 A1 | 1/2011 | Bryers et al. |
| 2011/0285731 A1* | 11/2011 | Andre et al. .................. 345/541 |
| 2011/0289263 A1 | 11/2011 | McWilliams et al. |
| 2012/0011391 A1 | 1/2012 | Callaway et al. |
| 2012/0233496 A1 | 9/2012 | Gil et al. |
| 2012/0303908 A1 | 11/2012 | Dantzig et al. |
| 2015/0019803 A1* | 1/2015 | Miller et al. .................. 711/105 |

OTHER PUBLICATIONS

Notice of Allowance and Fees Due dated Jun. 6, 2014 for U.S. Appl. No. 13/627,808.

Non-final Office Action dated Jul. 10, 2014 for U.S. Appl. No. 13/309,394.

Final Office Action dated Dec. 4, 2014 for U.S. Appl. No. 13/309,394.

Advisory Action dated Mar. 3, 2015 for U.S. Appl. No. 13/309,394.

Non-final Office Action dated Mar. 16, 2015 for U.S. Appl. No. 13/309,300.

Notice of Allowance and Fees Due dated Apr. 20, 2015 for U.S. Appl. No. 13/309,394.

* cited by examiner

GENERATING AN ORDERED SEQUENCE IN A DATABASE SYSTEM USING MULTIPLE INTERLEAVED CACHES

RELATED APPLICATIONS

The present application is related to co-pending U.S. patent application Ser. No. 13/309,394, entitled "REDUCING SEQUENCE CACHE LATCH CONTENTION IN A DATABASE SYSTEM" and co-pending U.S. patent application Ser. No. 13/309,300, entitled "FAILOVER AND RESUME WHEN USING ORDERED SEQUENCES IN A MULTI-INSTANCE DATABASE ENVIRONMENT", both filed on even date herewith, which are both hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of databases and more particularly to techniques for generating ordered sequences using semaphore protected interleaved caches.

BACKGROUND

Some embodiments of the present disclosure are directed to an improved approach for implementing/generating an ordered sequence in a database system using multiple interleaved caches. More particularly, some embodiments disclosed herein are a method and system for generating ordered sequences using semaphore protected interleaved caches.
Overview of Latch Contention In a modern database system for processing transactions (e.g., commercial transactions such as purchase orders, debits, credits, etc.) many users can use the system at the same time, and many users may have the same sorts of operations to perform. For example, if a user, say User A, desires to process a batch of purchase orders, he or she might want to assign each one of those purchase orders in the batch a unique number. And, it might be desired to assign those purchase orders a unique number within a contiguous sequence (e.g., PO-0001, PO-0002, PO-0003, etc.).

One technique is to assign a large range of contiguous numbers for all users to access and 'check-out' a contiguous sequence. For example, if User A desired to process a batch of say, 20 purchase orders, he or she might request a sequence comprising 20 contiguous numbers (e.g., 0001, 0002, 0003, . . . 0020). However a different user, say User B, might at the same time also desire to process a batch of purchase orders, and could at the same time request a sequence comprising 20 contiguous numbers. One legacy technique for ensuring that User A and User B do not receive the same sequence comprising 20 contiguous numbers is to enforce requests to be serialized. There are various techniques for serialization of requests, often involving serialization of requests using a flag or latch (or any implementation of a semaphore). In such a case for using a flag or latch, a first user (say User A) is granted access to the list of contiguous sequences, while any next users must wait. Then the first user is given the requested sequence (in this example, numbers 0001-0020), and the next waiting user's request is then processed. Given that the first user's request was satisfied (thus, the next available would be 0021) the first waiting user's request (e.g., a sequence of 20 contiguous numbers) can be satisfied by returning the sequence 0021, 0022, 0023 through 0040, and so on.

While use of the aforementioned flag or "sequence latch" is effective for serialization, in the case that there are a large number of users, there can be many users waiting for their turn to have their request satisfied, and the users can become 'backed up' as they contend for access to the sequence latch. In the case of modern database systems for processing a large number of transactions (e.g., transaction that need a sequence number), the waiting time can become as large a portion of time as the processing time. In fact, as the number of concurrent users increases and, as the number of requests for sequences increases, the portion of time spent in waiting can be larger than the remaining time needed to process the transaction.

Various implementations involving regimes of multiple latches, have been proposed, yet as the number of concurrent users increases and, as the processing power available to those concurrent users increases, the number of requests for sequences explodes, demanding new techniques to reduce or eliminate the portion of time spent in waiting for a sequence value to be satisfied and to reduce or eliminate the absolute amount of time spent waiting for a sequence value to be satisfied.

Moreover, the aforementioned technologies do not have the capabilities to perform generating ordered sequences using interleaved caches that reduce latency while still strictly observing the desired ordering.

Therefore, there is a need for an improved approach for implementing generating ordered sequences using semaphore protected interleaved caches.

SUMMARY

The present disclosure provides an improved method, system, and computer program product suited to address the aforementioned issues with legacy approaches. More specifically, the present disclosure provides a detailed description of techniques used in methods, systems, and computer program products for generating ordered sequences using protected interleaved caches, e.g., semaphore protected interleaved caches.

A plurality of database sessions execute concurrently and, regardless of the specific timing of any operations of the concurrently executing database sessions, any number of successively granted requests for sequence values generate an ordered sequence from a predetermined sequence of symbols using semaphore protected interleaved caches. The method commences by dividing the predetermined sequence of symbols into two or more interleaved caches, then mapping each of the two or more interleaved caches to a particular semaphore of a group of semaphores. Protected (serialized) access by the session processes is provided by granting access to one of the two or more interleaved caches only after one of the plurality of session processes performs a semaphore altering a read-modify-write operation on the particular semaphore. The interleaved caches are assigned values successively from the predetermined sequence using a round-robin assignment technique.

Further details of aspects, objectives, and advantages of the disclosure are described below in the detailed description, drawings, and claims. Both the foregoing general description of the background and the following detailed description are exemplary, and explanatory, and are not intended to be limiting as to the scope of the claims.

DETAILED DESCRIPTION

Some embodiments of the present disclosure are directed to an improved approach for implementing/generating ordered sequences (e.g., a sequence of successive integers) using semaphore protected interleaved caches. More particularly, disclosed herein are environments, methods, and systems for implementing generating ordered sequences using protected interleaved caches, e.g., semaphore protected interleaved caches.

Use of a flag or "sequence latch" is effective for serialization of requests for the next item from among a predetermined sequence of symbols; however, in the case that there are a large number of users, there can be many users waiting for their turn to have their requests satisfied, and the users can become 'backed up' as they contend for access to the sequence latch. In the case of modern database systems for processing a large number of transactions (e.g., transactions that need sequence numbers), the waiting time can become as large a portion of time as the processing time. In fact, as the number of concurrent users increases, and, as the number of requests for sequences increases, the portion of time spent in waiting can be larger than the remaining time needed to process the transaction.

One approach to ameliorate the undesirable aspects of time spent in waiting is to pre-allocate multiple blocks of sequences, and define multiple separate latches, each of which separate latch serves to serialize access to its corresponding block of sequences. This is somewhat analogous to having multiple "slave" queues instead of having only one "master" queue. To guarantee uniqueness of the sequences still demands access to the master queue, however there is likely to be less waiting in such a master/slave configuration as compared to having only one master queue.

Placing further demands on an appropriate architecture to address the aspect of waiting for a serialized access to receive a sequence is that a sequence can be shared across multiple database instances. That is, a database instance can have many sessions (even several thousands of instances, or more), depending on the configuration. Sessions using the same sequence within the same database instance can share the same cached sequence values.

Still more, techniques here present an approach for defining a large number of multiple sequence latches for creation of and access to interleaved sequences, and for permitting extremely low latency in access/wait time, yet still ensuring the desired sequence is observed.

Architecture Overview

Figure 1A:
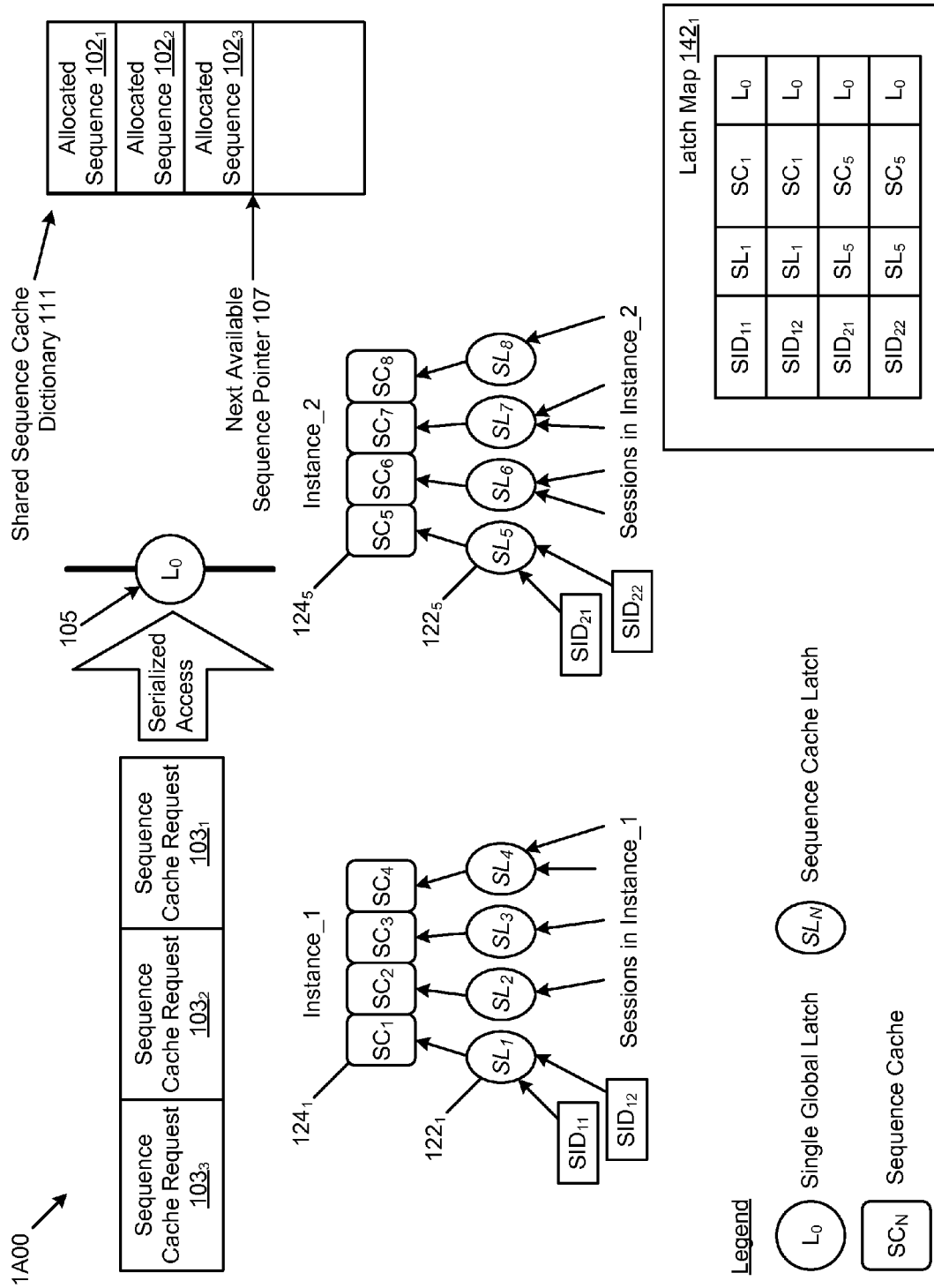
FIG. 1A is a diagrammatic representation of a system for generating ordered sequences using multiple tiers of semaphores, according to some embodiments.

FIG. 1A is a diagrammatic representation of a system for generating ordered sequences using multiple tiers of semaphores. As option, the present system 1A00 may be implemented in the context of the architecture and functionality of the embodiments described herein. Also, the system 1A00 or any aspect therein may be implemented in any desired environment.

As shown, a plurality of database instances (e.g., Instance_1, Instance_2, Instance_3, etc.) can each issue requests for a sequence (e.g., sequence cache request $103_1$, sequence cache request $103_2$, sequence cache request $103_3$, etc.), and, as shown, the requests are queued for access to a shared sequence cache dictionary 111, in which shared sequence cache dictionary any number of allocated sequences can be recorded (e.g., allocated sequence $102_1$, allocated sequence $102_2$, sequence $102_3$, etc.). Such a shared sequence cache dictionary, or variants, can be established during code development time, or such a shared sequence cache dictionary can be established dynamically when an instance of a database is defined.

Within a set of database instances, access to an allocated sequence 102 is granted only via the single global latch 105 (shown as $L_0$), and thus, requests are handled serially (though not necessarily in any particular order). Also shown in FIG. 1A is a next available sequence pointer 107, pointing to a location in the shared sequence cache dictionary, which location refers to the next unallocated sequence number in the shared sequence cache dictionary 111. Access to a next available sequence pointer, as well as to the next unallocated sequence, is granted only via the single global latch $L_0$.

In this embodiment, multiple sets of sequence values can be allocated, and a given allocated sequence value set can be stored in a sequence cache (e.g., SC1, SC2, SC3, etc.), the sequence cache being provided in a segment (or in multiple segments) comprised of volatile or non-volatile memory locations. Requests for an individual sequence values (e.g., 0001, 0002, etc.) can be made by any session in an instance, and such requests are serialized by use of sequence cache latch (e.g., $SL_1$, $SL_2$, $SL_3$), etc.

In fact, for handling a wide range of applications, and for providing flexibility in implementations, a data structure pertaining to a sequence cache request can be defined. One aspect of such a data structure serves to support caching. For example, if a sequence caching mechanism is desired, a sequence cache request 103 can include a data structure setting a CACHE option value to ON. The use of the sequence caches 124 (e.g., $124_1$, $124_5$) serves to avoid updating the high watermark and other attributes of a sequence in the shared sequence cache dictionary each and every time a new sequence value is requested. Yet, since it is possible that multiple sessions (e.g., thousands of sessions) might request a new sequence value at any time, and since (using only single master latch techniques), any accesses (e.g., accesses for a new sequence request) need to be serialized through the single master latch, such requests remain potentially expensive due to potentially long waiting times. More specifically, serialized access is expensive at least since when a first session is accessing (e.g., accessing for a new sequence request), the other sessions might be blocked from their accesses. Moreover, certain accesses (e.g., accesses to update a shared sequence cache dictionary, updates to a high watermark value, or updates to other attributes of a sequence in the shared sequence cache dictionary) can often consume many tens of thousands (or more) of machine instructions, so such accesses are thus considered expensive.

In the embodiment of system 1A00, the single global latch is used to serialize and safeguard access to the shared sequence cache dictionary, and the second tier of sequence cache latches (e.g., second tier $122_1$, second tier $122_5$, etc.) serve to serialize and safeguard access to individual sequence values in sequence caches 124. A latch map can be defined to map an instance of a second tier of sequence cache latch and a sequence cache (see latch map $142_1$). Yet, a session requesting an individual sequence value from a sequence cache 124 can suffer a high waiting penalty when contending for access.

Still further exacerbating the aforementioned penalty, recent trends and advances in computing (e.g., hyper-threading techniques) and advances in server hardware (e.g., a server having up to hundreds of processors comprised of multiple CPU cores) make it possible that hundreds or even many thousands of sessions can request access for sequences at the same time. One way to reduce the expense of serialization is to partition the shared sequence cache dictionary into multiple sequence caches and provide separate interleaved sequences, wherein each interleaved sequence has its own latch.

The improvements are herein provided for creating and consuming ordered sequence values from a sequence cache using multiple interleaved sequence caches to further reduce the likelihood of contention, and further reduce latency. The disclosed technique uses multiple interleaved sequences, each of which interleaved sequence cache is guarded by a corresponding semaphore. A group of semaphores (e.g., one bit per semaphore) can be organized into one or more bit vectors that (for example) reside in a shared memory area accessible to multiple sessions. Alternately, a semaphore can be organized into one bit within a byte or machine word that resides in a shared memory area accessible to multiple sessions. Multiple semaphores can be arranged into an array, for example, into an array comprised of a contiguous range of bytes or machine words.

Figure 1B:
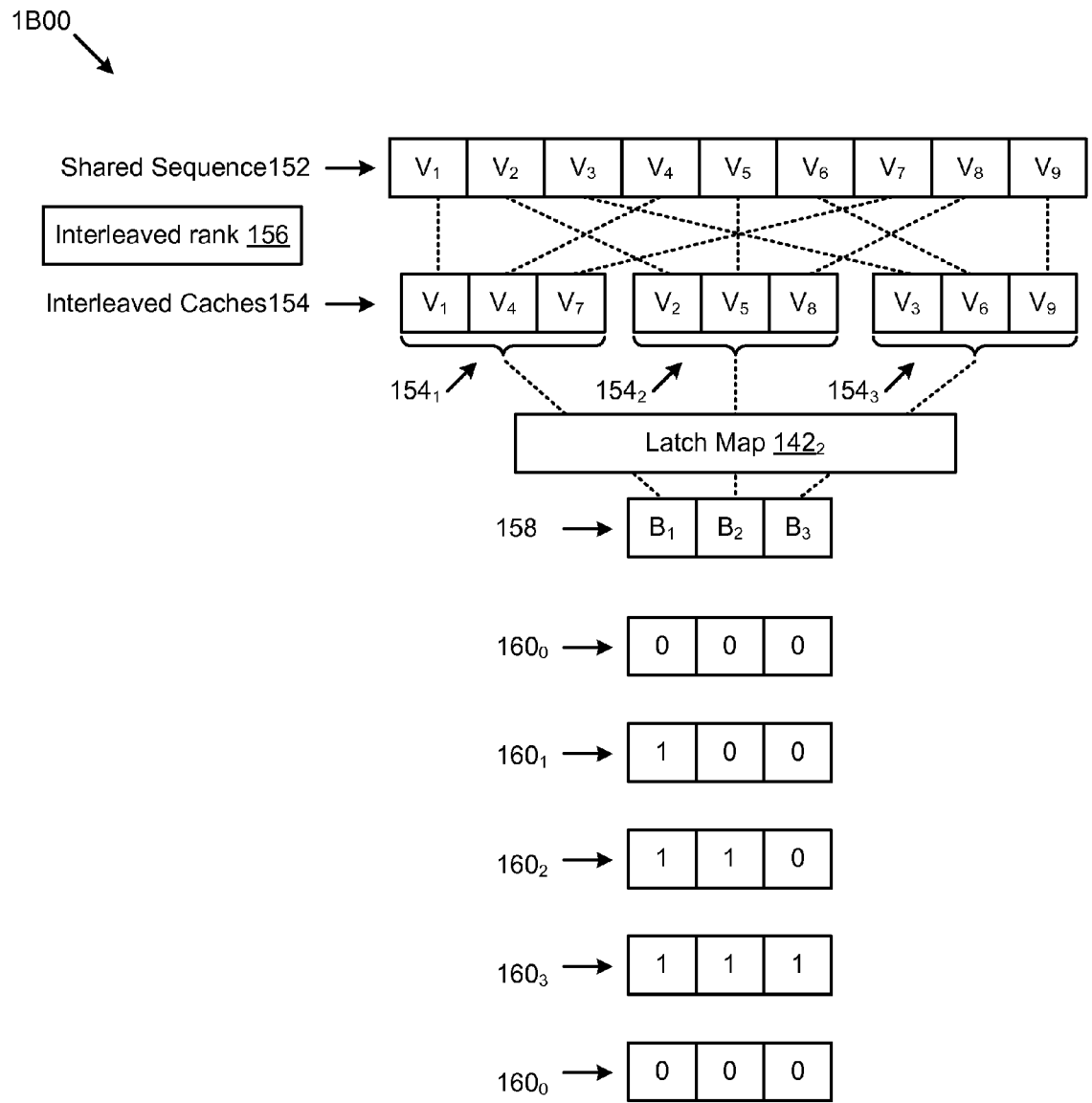
FIG. 1B is a diagrammatic representation of a system for generating ordered sequences using semaphore protected interleaved caches, according to some embodiments.

FIG. 1B is a diagrammatic representation of a system for generating ordered sequences using semaphore protected interleaved caches. As an option, the present system 1B00 may be implemented in the context of the architecture and functionality of the embodiments described herein. Also, the system 1B00 or any aspect therein may be implemented in any desired environment.

A shared sequence 152 is defined as comprising a sequence of values (e.g., in a particular desired order of distribution). In this example, the sequence of values is $V_1$ through $V_9$, as shown. The shared sequence 152 is divided into multiple interleaved caches 154. Given a shared sequence 152 as having a plurality of constituent values, the number of interleaved caches 154 results (in part) from dividing the number of constituent values by an interleave rank 156. In some embodiments, the interleave rank 156 is an integer, and the number of constituent values is evenly divisible by the integer value of the interleave rank 156. In other embodiments, the value of the interleave rank 156 is an integer multiple of 8 such that a bit vector (see below) can be stored in a byte.

In addition to dividing a predetermined sequence of constituent values into interleaved sets, embodiments herein assign successive values from the predetermined sequence using a round-robin assignment technique. Such a technique is shown and described in FIG. 4A and other places herein.

Also shown is a bit vector 158. In exemplary embodiments, a bit vector resides in a shared memory area, and each bit of bit vector 158 corresponds to one of the multiple interleaved caches 154. A bit of a bit vector can be a single bit of a byte or machine word. Or, a bit of a bit vector can be a bit as found in any location in a byte, or in an array of bytes. As used herein, the value of a bit in a bit vector can be operated upon in an atomic operation (e.g., a compare and swap (CAS) operation, a test and clear operation, etc.). For example, a bit vector can be organized as an array of bytes, where the rightmost bit is designated as a bit in a bit vector 158 as shown in Table 1.

TABLE 1

Organization of a Bit Vector Comprised of a Rightmost Bit in a Vector of Bytes

| Vector Component | Location of the bit | Value after Rotate | Value of Bit in PSW |
|---|---|---|---|
| Byte 1 | $0000000B_1$ | 00000000 | $B_1$ |
| Byte 2 | $0000000B_2$ | 00000000 | $B_2$ |
| Byte 3 | $0000000B_3$ | 00000000 | $B_3$ |

Given such an organization, the aforementioned atomic operation for test and clear can be implemented as a "rotate right" instruction wherein the atomic action of such a "rotate right" instruction serves to set the carry bit in a processor status word during the same instruction as the rotate is performed. Many instructions in a processor are known as "read-modify-write" instructions, and the read and (conditional modify) and write operations are atomic within the boundary of a single instructions.

Now a use of the above structures in the context of generating ordered sequences using semaphore protected interleaved caches can be described. More specifically, the example as follows uses the specific case of the polarity of the bit vector as shown. When a session requests a sequence value, the processing of the session finds the first 'zero' bit, and an atomic operation (e.g., a compare and swap operation) is performed on the bit vector to secure (set) the bit, which bit has a corresponding interleaved cache 154. The corresponding interleaved cache 154 is accessed in order to pick up the next sequence value.

In some embodiments, the bit vector resides in a shared memory area that is accessible by all sessions within the given database. The use of the atomic CAS operation on the bit vector eliminates the need for additional sequence latches for controlling access to each sequence cache. The aforementioned atomic operation serves for granting access successively to serialize access by session processes to one of interleaved caches only after one of the session processes performs a successful semaphore altering operation (e.g., clearing, setting, shifting, read-modify-write operation) on the particular semaphore. Exemplary operation proceeds as follows: Initially, all the bits in the given bit vector are set to zero (see bit vector state $160_0$). As earlier described, the CAS operation on the bit vector operates on the first zero bit from the left in order to identify which one of the interleaved caches from which to pick up its next sequence value, and the CAS operation will "swap" that zero bit to set it to a value of '1' during the atomic operation (e.g., single instruction).

As shown, the interleaved caches are organized as follows: Given the sequence having values $V_1$ through $V_9$ (e.g., the values corresponding one-to-one to numbers from 1 to 9) comprising a shared sequence 152, then the values $V_1$ through $V_9$ are to be allocated into the interleaved caches 154 (e.g., interleaved cache $154_1$, interleaved cache $154_2$, interleaved cache $154_3$,). In this embodiment the shared sequence 152 contains nine values, and the interleave rank 156 is set to three (not shown), and thus the interleaved caches 154 are constructed such that the first interleaved cache 154 holds [$V_1$, $V_4$, and $V_7$], the second interleaved cache holds [$V_2$, $V_5$, and $V_8$], and the third interleaved cache holds [$V_3$, $V_6$, $V_9$]. Thus, the original shared sequence 152 is arranged into multiple interleaved caches such that the sequence values arranged into those interleaved caches can be retrieved in the precise order of the original shared sequence 152 is guaranteed, regardless of the timing of accesses from any number of session processes.

Continuing the discussion of operation, the bit vector 158 is initialized with all 0's (e.g., as depicted by bit vector state $160_0$). The first session process accesses the bit vector to perform a compare and swap operation (to find the first 0 in the bit vector and locate the corresponding interleaved cache). The CAS operation then swaps this 0 bit to the value of 1, and the session process proceeds to access the interleaved cache $154_1$. As shown, the bit $B_1$ in bit vector 158 corresponds to interleaved cache $154_1$, and the bit $B_2$ in bit vector 158 corresponds to interleaved cache $154_s$ and so on. However, any one-to-one mapping is possible using a latch map 142 (e.g., latch map $142_1$, also see latch map $142_2$ as shown in FIG. 1C).

Thus, it follows that the interleaved cache is designed in such a way that the retrieved order is guaranteed to be the same order as in the predetermined sequence of symbols sequence, regardless of the timing or order of accesses from the multiple session processes.

Figure 1C:
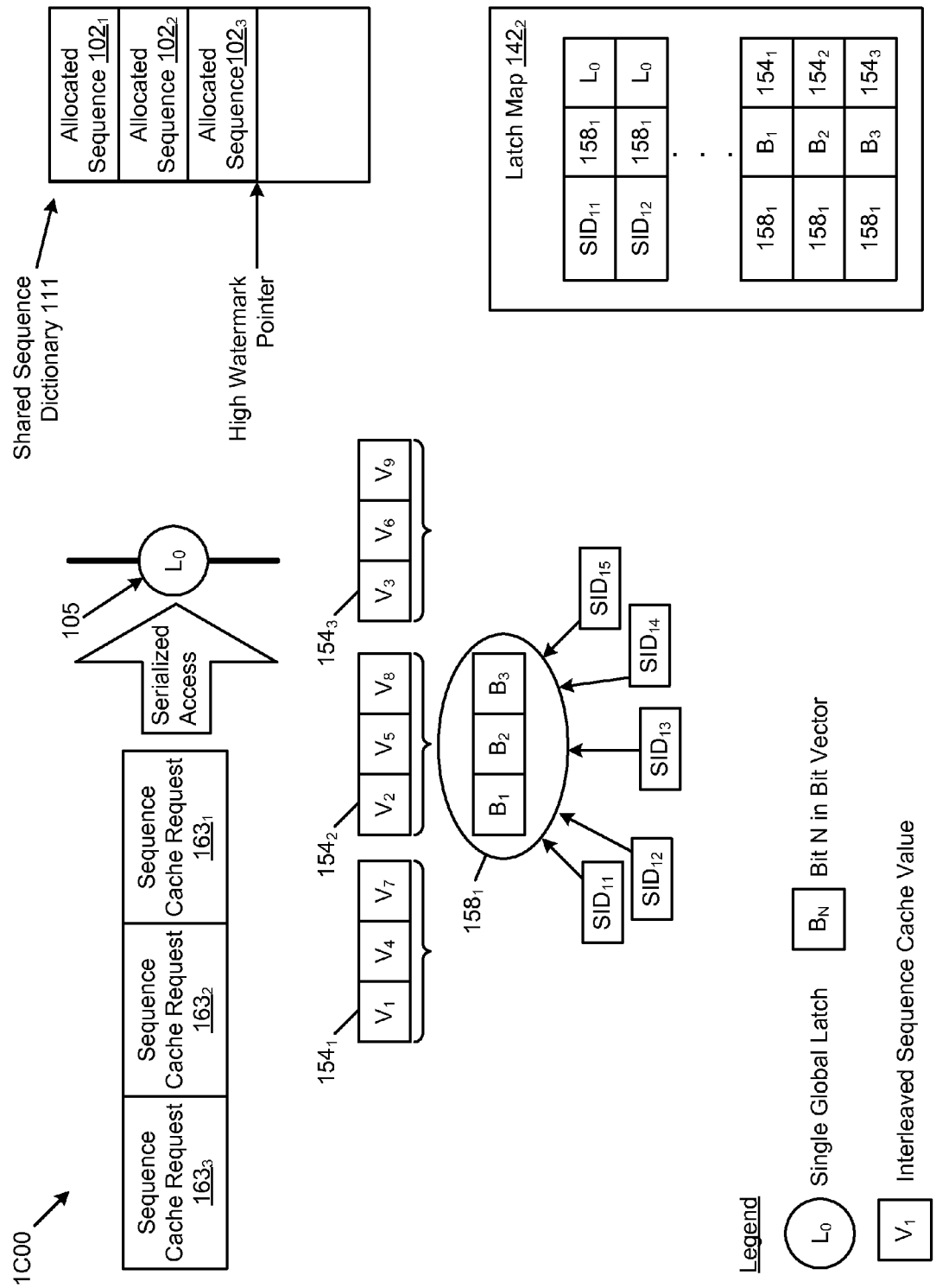
FIG. 1C is a diagrammatic representation of a system for generating ordered sequences using semaphore protected interleaved caches, according to some embodiments.

FIG. 1C is a diagrammatic representation of a system for generating ordered sequences using semaphore protected interleaved caches. As an option, the present system 1C00 may be implemented in the context of the architecture and functionality of the embodiments described herein. Also, the system 1C00 may be implemented in any desired environment.

As shown, the session processes $SID_{11}$, $SID_{12}$, $SID_{13}$, etc. all access the bit vector $158_1$. This is exemplified in the embodiment of latch map $142_2$ (see the row showing $SID_{11}$ and mapping to bit vector $158_1$). Also, latch map $142_2$ provides mappings from bit vector $158_1$ to particular bits of the bit vector $158_1$. The example follows the example of FIG. 1B, such that the bit $B_1$ in bit vector $158_1$ corresponds to interleaved cache $154_1$, and the bit $B_2$ in bit vector $158_1$ corresponds to interleaved cache $154_2$ and so on. In some embodiments, a latch map $142_2$ provides mappings that serve for mapping each of two or more interleaved caches to a particular semaphore, and vice versa. For example, bit $B_1$ in bit vector $158_1$ corresponds to (e.g., is mapped to) interleaved cache $154_1$, and interleaved cache $154_1$ corresponds to (e.g., is mapped to) bit $B_1$ in bit vector $158_1$.

Figure 1D:
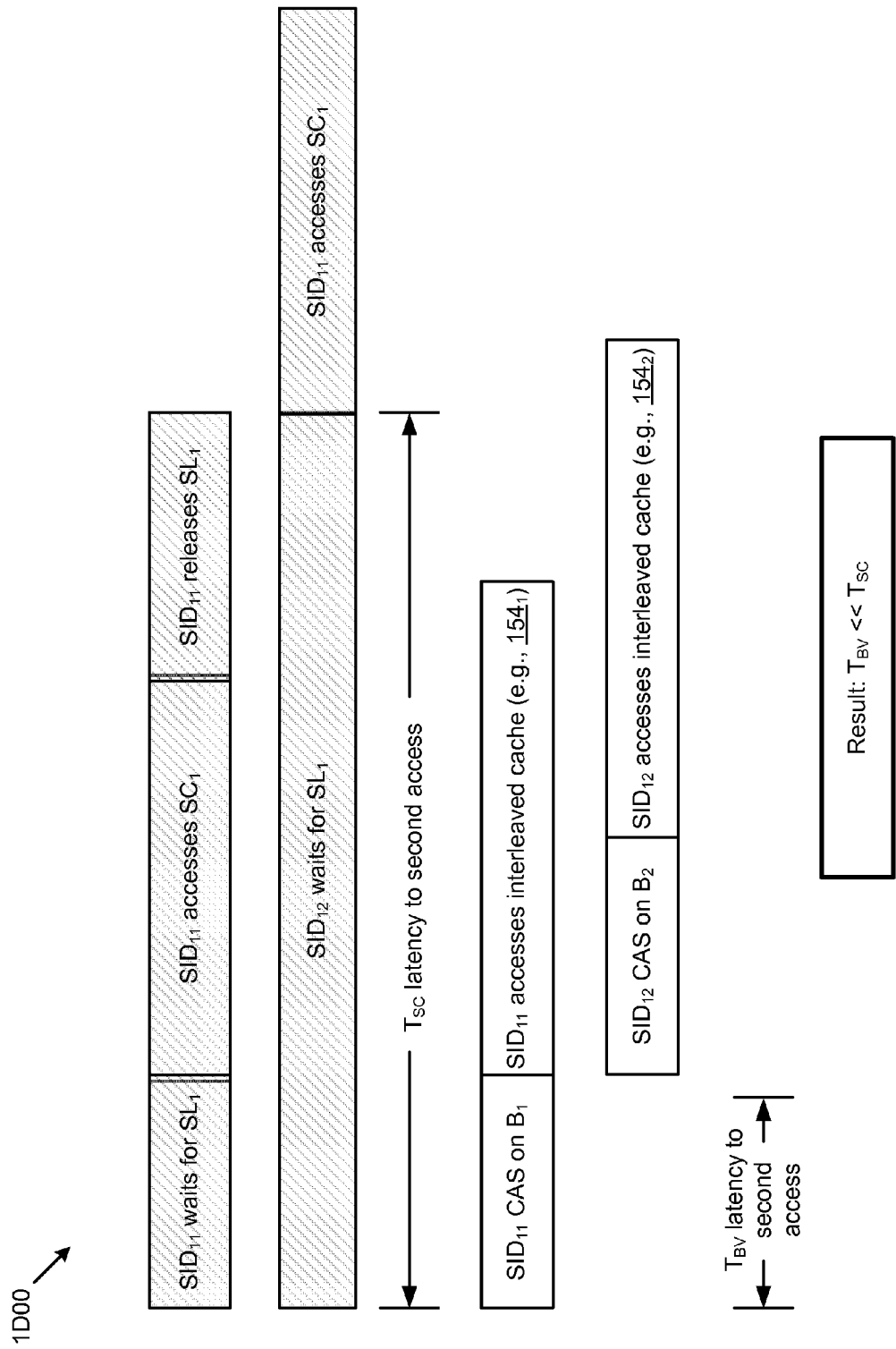
FIG. 1D is a diagrammatic representation comparing two systems for generating ordered sequences, according to some embodiments.

FIG. 1D is a diagrammatic representation comparing two systems for generating ordered sequences. As option, the present system 1D00 may be implemented in the context of the architecture and functionality of the embodiments described herein. Also, the system 1D00 may be implemented in any desired environment.

The timing aspects of system 1D00 exemplify the improvements of system 1C00 (shaded portions) over system 1A00. Specifically, and as shown, operation under the regime of system 1A00 has advantages over other semaphore-based systems in that many session processes (e.g., $SID_{11}$, $SID_{21}$, etc.) can access separate semaphores so as to reduce contention. Yet, there remains the possibility for contention when two or more session processes are assigned to the same semaphore. In such a case of contention, the latency for a second access in the presence of contention can be as long as the time for the first access to achieve access to is semaphore (e.g., $SL_1$), plus the time to access the corresponding sequence cache (e.g., $SC_1$), plus the time to release its semaphore (e.g., $SL_1$). This latency can be reduced using the techniques disclosed herein, and are significantly reduced. More specifically, and as shown in FIG. 1D (see the unshaded portions), the session process $SID_{11}$ performs a CAS on a bit vector (e.g., bit $B_1$), and proceeds to access the corresponding interleaved cache. In contrast to the regime of system 1A00 and in accordance with system 1C00, the second access (e.g., by session process $SID_{12}$) can be satisfied almost immediately after the just preceding atomic CAS operation by session process $SID_{11}$. Thus, the waiting latency $T_{BV}$ using the bit vector techniques of system 1C00 is much shorter than the waiting latency $T_{SC}$ using the sequence caches of system 1A00.

Figure 2:
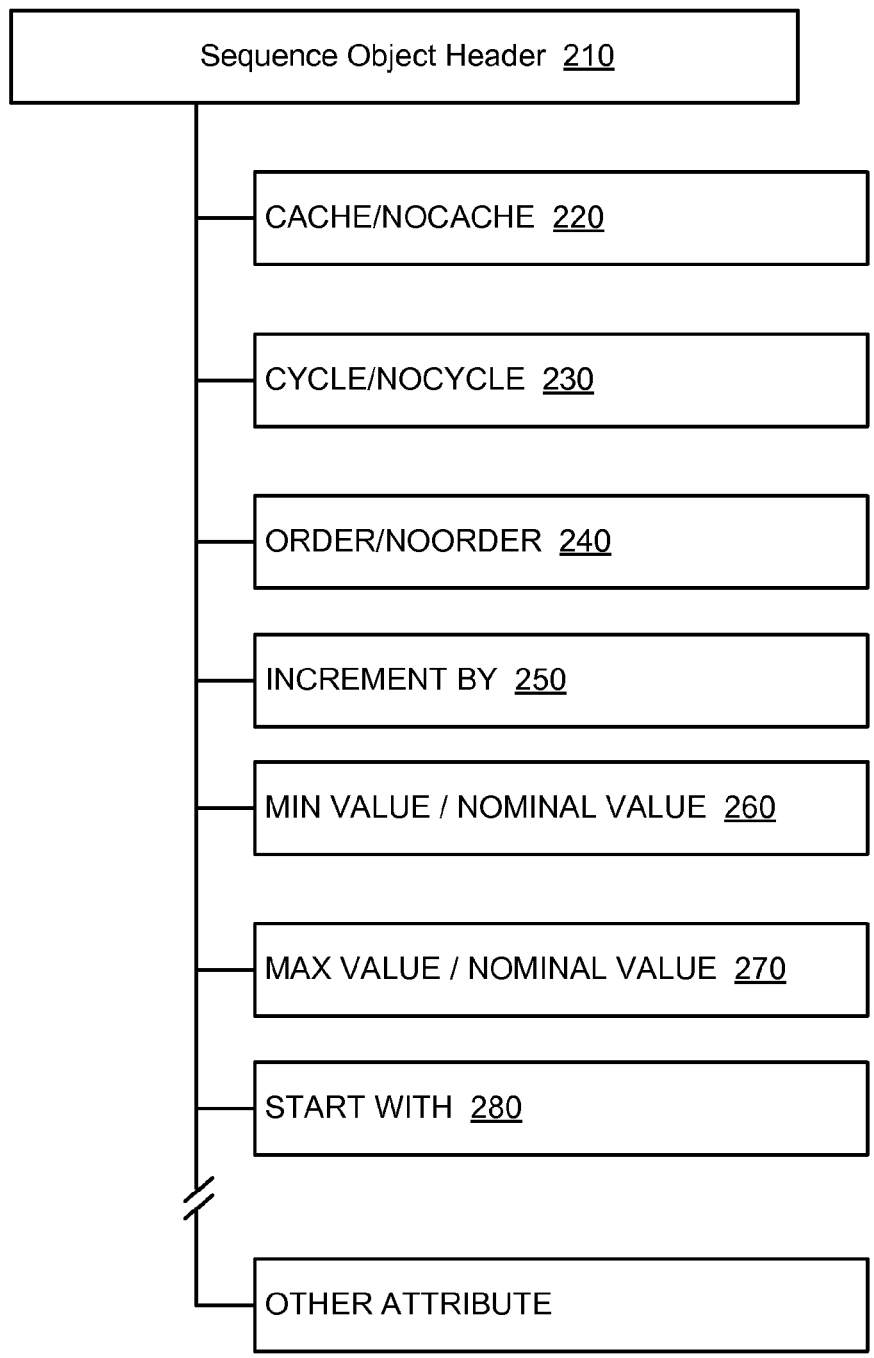
FIG. 2 is a diagram of a sequence object for generating ordered sequences using semaphore protected interleaved caches, according to some embodiments.

FIG. 2 is a diagram of a sequence object for generating ordered sequences using semaphore protected interleaved caches. As option, the present sequence object 200 may be implemented in the context of the architecture and functionality of the embodiments described herein. Also, the sequence object 200 or any aspect therein may be implemented in any desired environment.

As used herein, a "sequence" is embodied as a user created database object that can be shared by multiple users to generate unique identifiers (e.g., integers). As shown, the sequence object has attributes as in Table 2:

TABLE 2

| Attributes | |
|---|---|
| Data Element | Description |
| Sequence Object Header 210 | Metadata pertaining to the object and its constituent components. Can apply to any one or more instances of the object. |
| CACHE/NOCACHE 220 | Boolean Flag: Specifies if the instance of the object is cached (or not). |
| CYCLE/NOCYCLE 230 | Boolean Flag: Specifies if the instance of the object supports recycling (reusing) sequence identifiers (or not). |

TABLE 2-continued

Attributes

| Data Element | Description |
| --- | --- |
| ORDER/NOORDER 240 | Boolean Flag: Specifies if the instance of the object enforces ordering (or not). |
| INCREMENT BY 250 | Boolean Flag: Specifies if the instance of the object enforces algorithmic incrementation (or not). |
| MIN VALUE/NOMINAL VALUE 260 | Value (e.g., integer value): Specifies the minimum value to use in an algorithmic incrementation. |
| MIN VALUE/NOMINAL VALUE 270 | Value (e.g., integer value): Specifies the maximum value to use in an algorithmic incrementation. |
| START WITH 280 | Value (e.g., integer value): Specifies the initial value to use in an algorithmic incrementation. |
| OTHER ATTRIBUTE | Other attribute or pointer to other attributes |

The database objects and techniques of the embodiments as shown and described above can be applied to database systems following any regime to provide for ordered sequences and sequence caches (e.g., interleaved sequence caches, or non-interleaved sequence caches). In some embodiments, a sequence object 200 can be stored in a shared sequence cache dictionary 111, and a populated instance of a sequence object 200 can represent a particular allocated sequence 102.

As earlier discussed, such a sequence object 200 can be used in systems for managing ordered sequences, and a sequence object 200 can serve to maintain the existence of and attributes of a shared sequence.

Strictly as an example, attributes of a shared sequence within a sequence object 200 can be used to determine a sequence of symbols (e.g., values, integers) algorithmically (e.g., an algorithmic incrementation by 1, or an algorithmic incrementation by 2, etc.).

Figure 3:
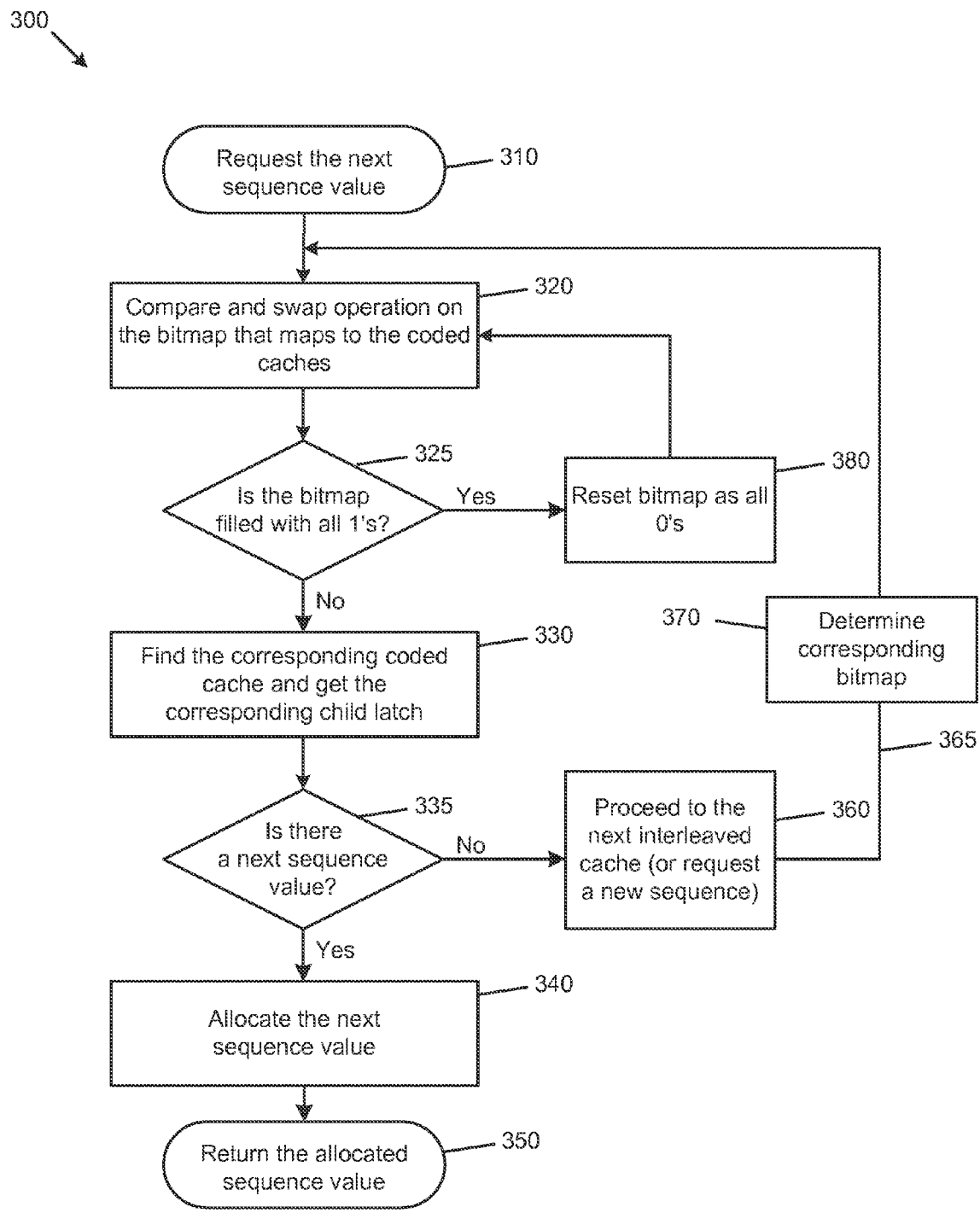
FIG. 3 is a flow chart a system for generating ordered sequences using semaphore protected interleaved caches, according to some embodiments.

FIG. 3 is a flow chart a system for generating ordered sequences using semaphore protected interleaved caches. As option, the present a system 300 may be implemented in the context of the architecture and functionality of the embodiments described herein. Also, the system 300 or any aspect therein may be implemented in any desired environment.

The operations pertaining to generating ordered sequences with multiple interleaved caches in a database system is illustrated in the flow chart of system 300. As shown, flow commences when a request for a 'next' sequence value of an existing sequence is made (see operation 310). A compare and swap (CAS) operation (or any other atomic read-modify-write operation) is performed on the bit vector, each bit of which corresponds to a particular interleaved cache (see operation 320). In this sense, each interleaved cache is "guarded" by its corresponding latch. Such operations (e.g., operation 310 and operation 320) can be performed repeatedly by one or more session processes. Accordingly, after some number of accesses, the bit vector will become filled with all 1's and this state can be detected by a test, as is shown in decision 325. When the bit vector is filled with all 1's the "Yes" branch of decision 325 is taken, and the results from operation 320 (and the test of decision 325) serve to advance to operation 380. Continuing with this example, at this point in time, the bit vector has been reset to contain all 0's (see operation 380) so that the decision 325 will take the "No" branch, and the operation 330 will map to the corresponding interleaved cache 154. The "next" sequence value is allocated (see operation 340) and given out (see operation 350) if there are available sequence values in that interleaved cache. Alternatively, if there are no available sequence values in that interleaved cache (see decision 335), then processing will move to the next interleaved cache, which is accessed in order to check the availability of the sequence values within the next interleaved cache. There might be unallocated values in the next accessed interleaved cache, or there might not be. In the case that there are unallocated values in the next accessed interleaved cache, then path 365 is taken, and operation 370 serves to determine the bitmap that corresponds to the next accessed interleaved cache that contains unallocated values (see operation 360).

It is possible that the successive checking process continues to the next successive interleaved cache and all of the interleaved caches are found to be empty, at which time a new range of sequence values is requested (see operation 360). A new range of sequence values can be requested from the shared sequence cache dictionary 111 to again fill up all the interleaved caches.

Figure 4A:
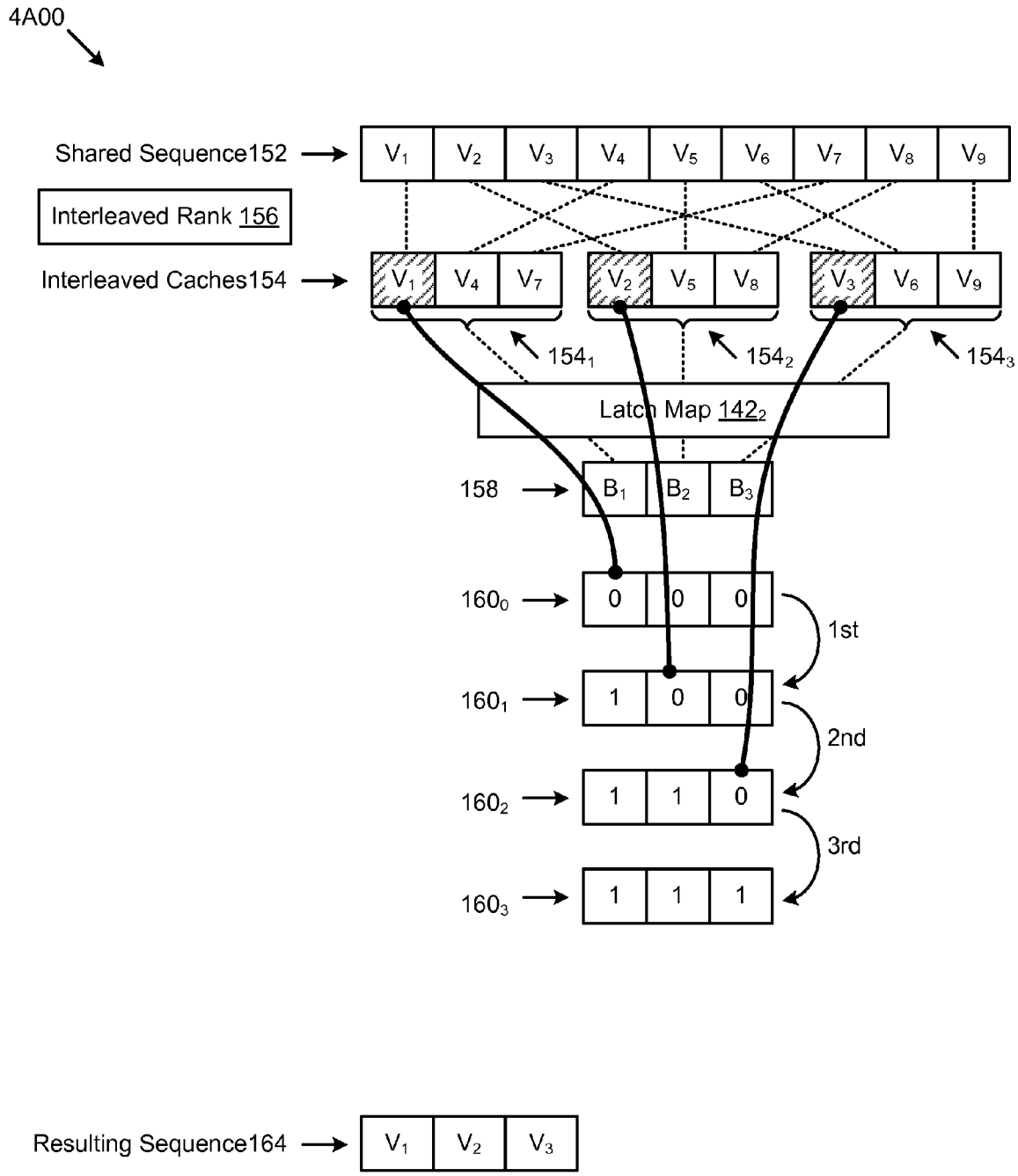
FIG. 4A is a diagrammatic representation of the state of data structures after a third sequence value request for generating ordered sequences using semaphore protected interleaved caches has completed, according to some embodiments.

FIG. 4A is a diagrammatic representation of the state of data structures 4A00 after a third sequence value request for generating ordered sequences using semaphore protected interleaved caches. As option, the data structures 4A00 may be implemented in the context of the architecture and functionality of the embodiments described herein. Also, the states of data structures 4A00 or any aspect therein may be implemented in any desired environment.

The states of data structures 4A00 exemplify the state changes as a computer implemented method for generating an ordered sequence operates. The depiction includes a predetermined sequence of symbols (e.g., shared sequence 152) which is divided into three interleaved caches. The given predetermined sequence of symbols comprises nine values, $V_1$ through $V_9$, and the three interleaved caches each comprise three values, which values are assigned using a round-robin techniques (as shown). The latch map $142_2$ provides a mapping between the interleaved caches to a particular semaphore. As shown, the semaphore $B_1$ is mapped to interleaved cache $154_1$, comprising values $V_1$, $V_4$ and $V_7$. Similarly, the semaphore $B_2$ is mapped to interleaved cache $154_2$, comprising values $V_2$, $V_5$ and $V_8$, and so on.

In this embodiment the group of semaphores $B_1, B_2, B_3$ are organized in a bit vector 158, which is stored in a shared memory. The shared memory is accessible by a plurality of session processes and. regardless of the timing of any request from any of the session processes, the next value in the predetermined sequence is returned to the requesting session process. The act of a semaphore altering read-modify-write operation on a particular semaphore (e.g., as performed by the requesting session processes) serves to grant access to the next one of the interleaved caches.

Continuing this example, the first request would encounter bit vector state $160_0$, having all zeroes. The semaphore altering read-modify-write operation on the particular semaphore $B_1$ would result in the value of $B_1$ being set to '1', resulting in bit vector state $160_1$. The next available value from $B_1$'s corresponding interleaved cache $154_1$ is returned to the requestor, and the value $V_1$ is retired (as depicted by the cross-hatching). The second request (e.g., from any session process mapped to bit vector 158) would encounter bit vector state $160_1$, having a leftmost '1' value, and the remaining values showing zeroes. The semaphore altering read-modify-write operation on the particular semaphore $B_2$ would result in the value of $B_2$ being set to '1' and, in turn, resulting in bit vector state $160_2$. The next available value from $B_2$'s corresponding interleaved cache $154_2$ is returned to the requestor, and the value $V_2$ is retired (as depicted by the cross-hatching). This process continues, and regardless of the timing of any request from any of the session processes, the next value in the predetermined sequence is returned to the requesting session process.

Figure 4B:
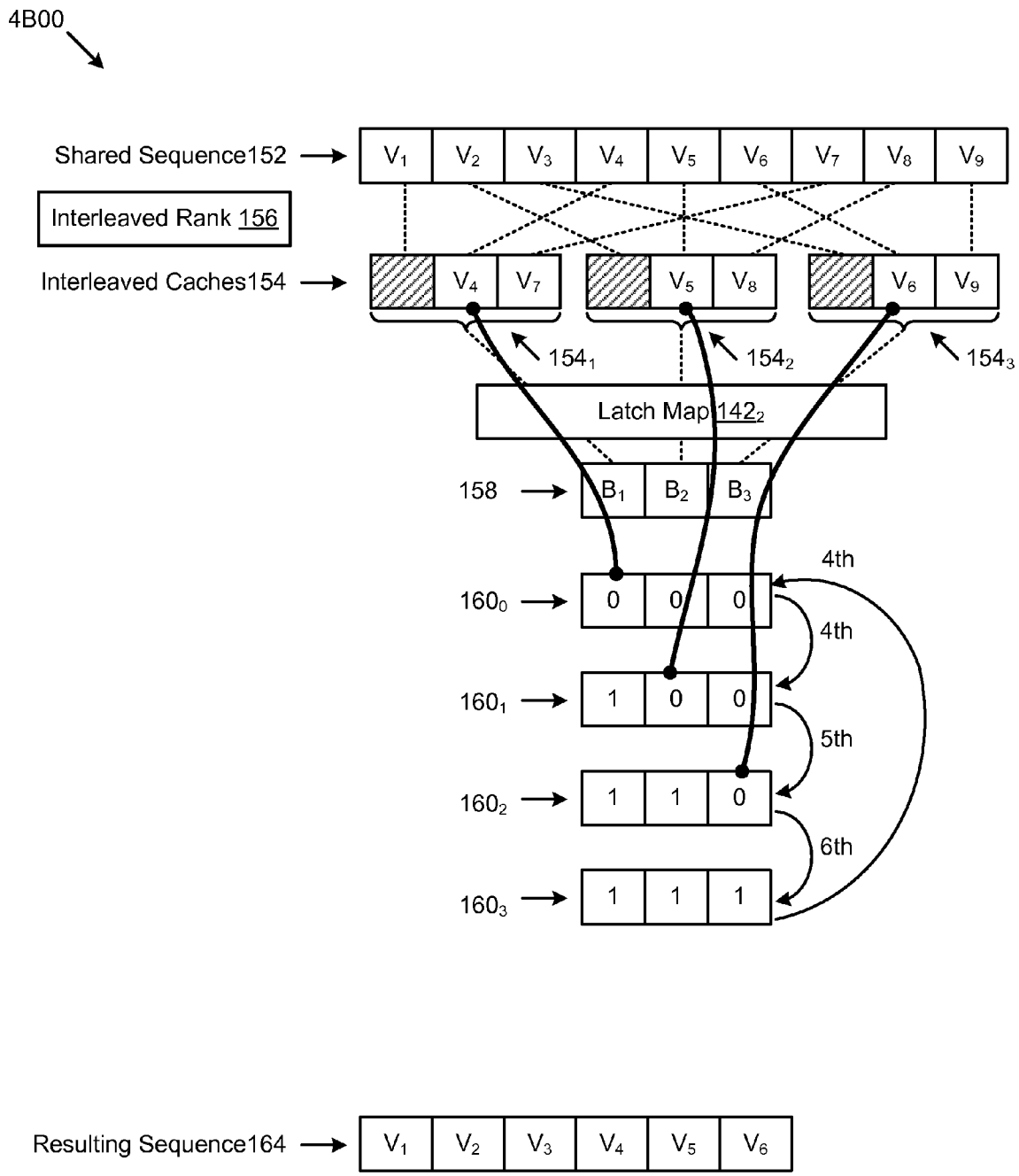
FIG. 4B is a diagrammatic representation of the state of data structures after a sixth sequence value request for generating ordered sequences using semaphore protected interleaved caches has completed, according to some embodiments.

FIG. 4B is a diagrammatic representation of the state of data structures 4B00 after a sixth sequence value request for generating ordered sequences using semaphore protected interleaved caches has completed. As an option, the present the state of data structures after a sixth sequence value request may be implemented in the context of the architecture and functionality of the embodiments described herein. Also, the state of data structures after a sixth sequence value request or any aspect therein may be implemented in any desired environment.

The sequence of operations shown and described in FIG. 4A continues until all values in the bit vector have become '1'. At such a time (in this case, upon the fourth request), the bit vector is reset to "all 0's", and the session process performing the fourth serviced request would encounter a bit vector of all 1's. Accordingly (and see decision 325 of FIG. 3), the bit vector would be returned to a state of all 0's. The fourth serviced request would receive value $V_4$, the fifth would receive the value $V_5$, and so on.

Figure 4C:
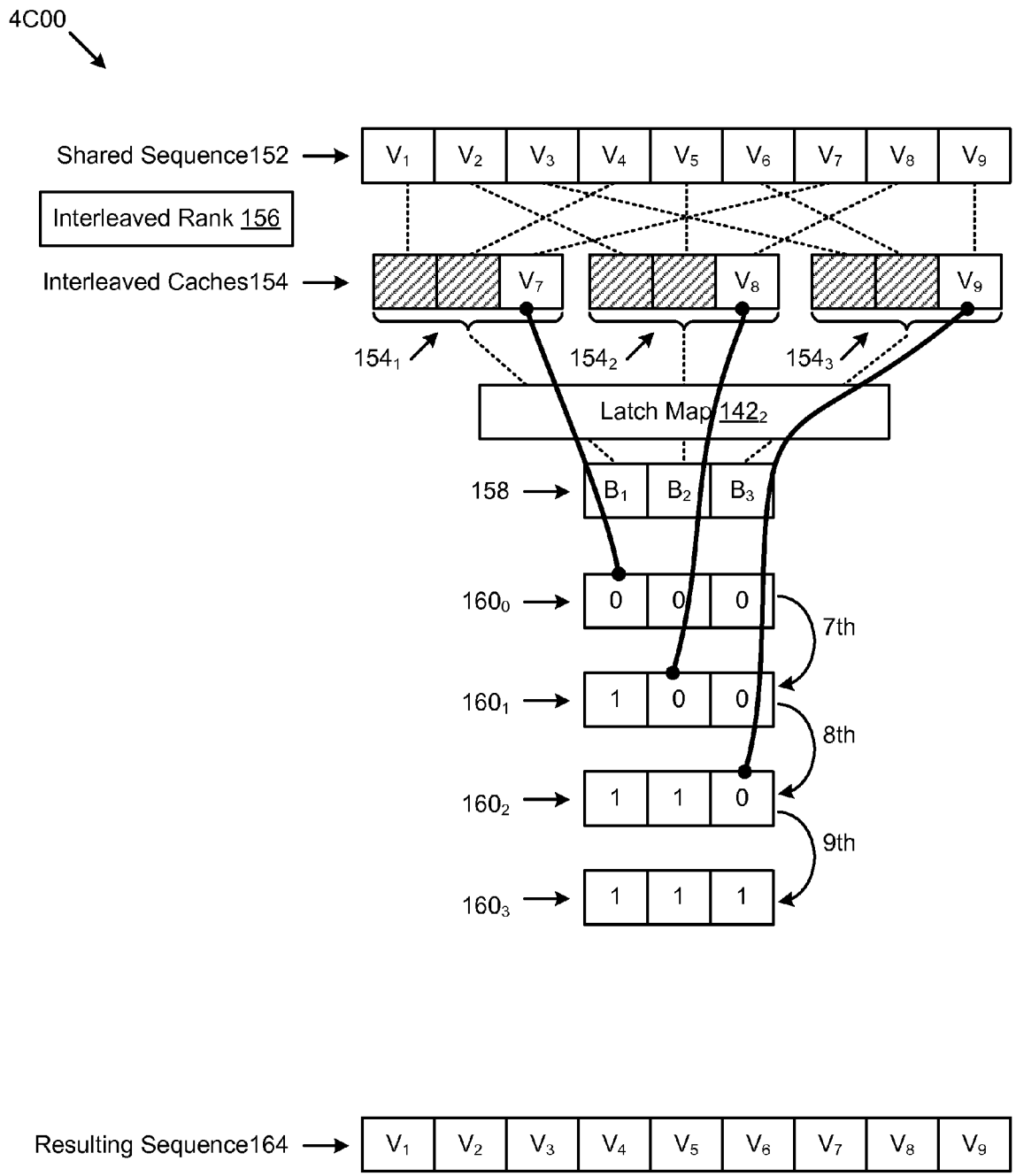
FIG. 4C is a diagrammatic representation of the state of data structures after a ninth sequence value request for generating ordered sequences using semaphore protected interleaved caches has completed, according to some embodiments.

FIG. 4C is a diagrammatic representation the state of data structures 4C00 after a ninth sequence value request for generating ordered sequences using semaphore protected interleaved caches has completed. As an option, the present the state of data structures after a ninth sequence value request may be implemented in the context of the architecture and functionality of the embodiments described herein. Also, the state of data structures after a ninth sequence value request or any aspect therein may be implemented in any desired environment.

The sequence of operations shown and described in FIG. 4A and FIG. 4B continues until all values in all of the interleaved caches have been retired. When all of the interleaved caches are found to be empty, a new range of sequence values is requested (see operation 360 of FIG. 3). A new range of sequence values can be requested from the shared sequence cache dictionary 111 to again fill up all the interleaved caches.

Figure 4D:
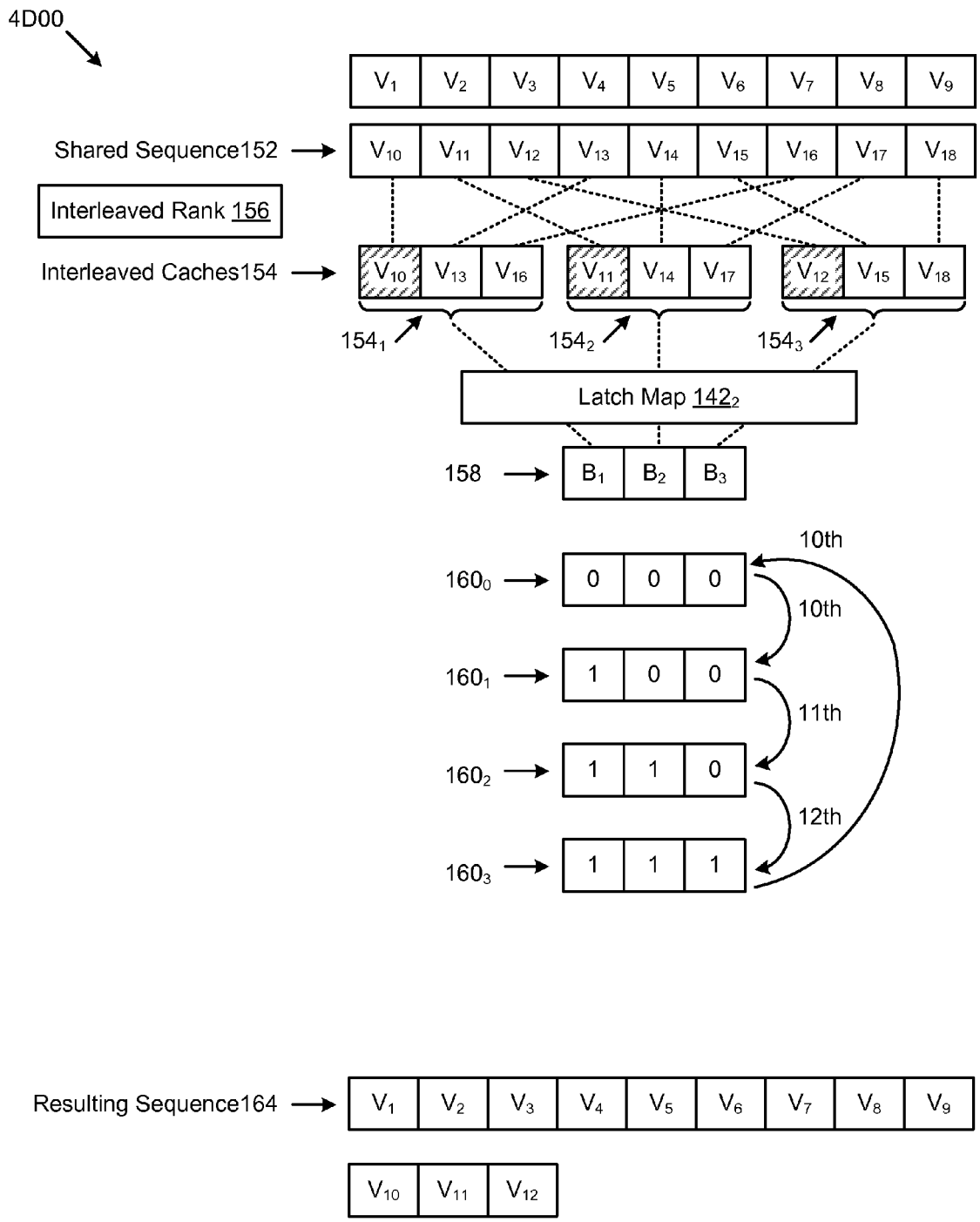
FIG. 4D is a diagrammatic representation of the state of data structures after a Nth sequence value request for generating ordered sequences using semaphore protected interleaved caches has completed, according to some embodiments.

FIG. 4D is a diagrammatic representation of the state of data structures 4D00 after an Nth sequence value request for generating ordered sequences using semaphore protected interleaved caches has completed. As option, the present the state of data structures after a Nth sequence value request may be implemented in the context of the architecture and functionality of the embodiments described herein. Also, the state of data structures after a Nth sequence value request or any aspect therein may be implemented in any desired environment.

Continuing the example of the foregoing FIG. 4A-FIG. 4C, the system 4D00 shows a new range of sequence values and the round-robin allocation to the interleaved caches. The sequences and operations of the foregoing FIG. 4A-FIG. 4C continue, resulting in the desired sequence being returned in the predetermined order (e.g., see resulting sequence 164).

Additional Embodiments of the Disclosure

Figure 5:
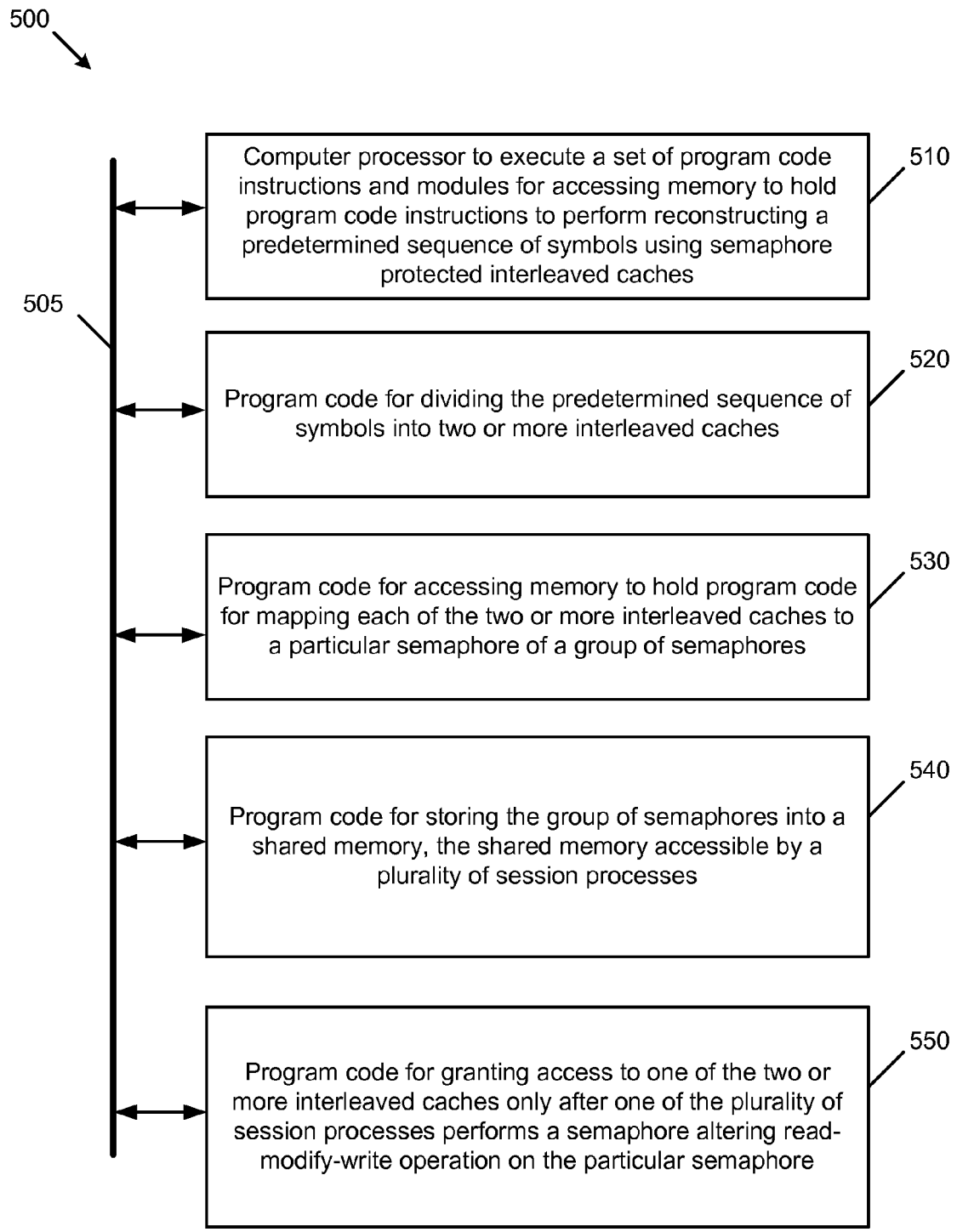
FIG. 5 depicts block diagram of a system to perform certain functions of a computer system, according to some embodiments.

FIG. 5 depicts a block diagram of a system to perform certain functions of a computer system. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform reconstructing a predetermined sequence of symbols using semaphore protected interleaved caches, the method comprising: dividing the predetermined sequence of symbols into two or more interleaved caches (see module 520); mapping each of the two or more interleaved caches to a particular semaphore of a group of semaphores (see module 530); storing the group of semaphores into a shared memory, the shared memory accessible by a plurality of session processes (see module 540); and granting access to one of the two or more interleaved caches only after one of the plurality of session processes performs a semaphore altering read-modify-write operation on the particular semaphore (see module 550).

System Architecture Overview

Figure 6:
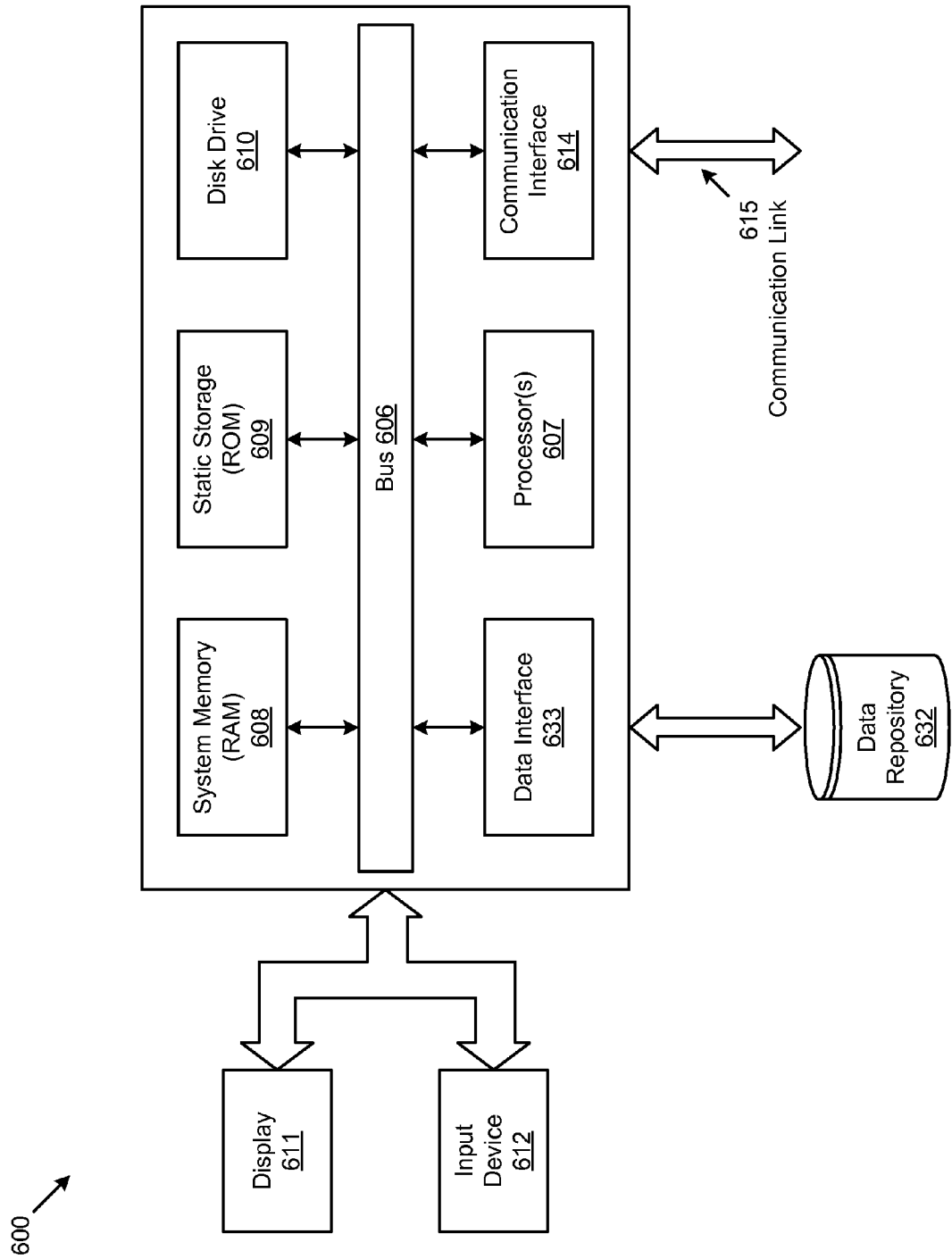
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device 609 (e.g., ROM), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 632.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device 609 or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to other embodiments of the disclosure, two or more computer systems 600 coupled by a communication link 615 (e.g., LAN, PTSN, or wireless network) may perform the sequence of instructions required to practice the disclosure in coordination with one another.

Computer system 600 may transmit and receive messages, data, and instructions, including program, i.e., application code, through communication link 615 and communication interface 614. Received program code may be executed by processor 607 as it is received, and/or stored in disk drive 610 or other non-volatile storage for later execution. Computer system 600 may communicate through a data interface 633 to a database on an external data repository 632. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for generating an ordered sequence from a predetermined sequence of symbols using semaphore protected interleaved caches, the method comprising:
    dividing the predetermined sequence of symbols into two or more interleaved caches;
    mapping each of the two or more interleaved caches to a particular semaphore of a group of semaphores;
    storing the group of semaphores into a shared memory, the shared memory accessible by a plurality of session processes; and
    granting access to one of the two or more interleaved caches only after one of the plurality of session processes performs a semaphore altering read-modify-write operation on the particular semaphore.

2. The method of claim 1, wherein the predetermined sequence of symbols is a sequence of successive integers.

3. The method of claim 1, wherein the predetermined sequence of symbols is determined algorithmically using a sequence object.

4. The method of claim 1, wherein the predetermined sequence of symbols is divided into a two or more interleaved caches using an interleave rank value.

5. The method of claim 1, wherein the predetermined sequence of symbols is assigned into a two or more interleaved caches uses a round-robin assignment.

6. The method of claim 1, wherein storing the group of semaphores into a shared memory comprises storing two or more semaphores into contiguous bits in a machine word.

7. The method of claim 1, wherein storing the group of semaphores into a shared memory comprises storing two or more semaphores into contiguous machine words in an array.

8. A computer system to generating ordered sequences using semaphore protected interleaved caches, comprising:
    a computer processor to execute a set of program code instructions; and
    a memory to hold the program code instructions, in which the program code instructions comprises program code to perform:
    dividing the predetermined sequence of symbols into two or more interleaved caches;
    mapping each of the two or more interleaved caches to a particular semaphore of a group of semaphores;
    storing the group of semaphores into a shared memory, the shared memory accessible by a plurality of session processes; and
    granting access to one of the two or more interleaved caches only after one of the plurality of session processes performs a semaphore altering read-modify-write operation on the particular semaphore.

9. The computer system of claim 8, wherein the predetermined sequence of symbols is a sequence of successive integers.

10. The computer system of claim 8, wherein the predetermined sequence of symbols is determined algorithmically using a sequence object.

11. The computer system of claim 8, wherein the predetermined sequence of symbols is divided into a two or more interleaved caches using an interleave rank value.

12. The computer system of claim 8, wherein the predetermined sequence of symbols is assigned into a two or more interleaved caches uses a round-robin assignment.

13. The computer system of claim 8, wherein storing the group of semaphores into a shared memory comprises storing two or more semaphores into contiguous bits in a machine word.

14. The computer system of claim 8, wherein storing the group of semaphores into a shared memory comprises storing two or more semaphores into contiguous machine words in an array.

15. A computer program product embodied in a non-transitory computer readable medium, the computer readable medium having stored thereon a sequence of instructions which, when executed by a processor causes the processor to execute a method to implement generating ordered sequences using semaphore protected interleaved caches, the method comprising:
    dividing the predetermined sequence of symbols into two or more interleaved caches;
    mapping each of the two or more interleaved caches to a particular semaphore of a group of semaphores;
    storing the group of semaphores into a shared memory, the shared memory accessible by a plurality of session processes; and
    granting access to one of the two or more interleaved caches only after one of the plurality of session processes performs a semaphore altering read-modify-write operation on the particular semaphore.

16. The computer program product of claim 15, wherein the predetermined sequence of symbols is a sequence of successive integers.

17. The computer program product of claim 15, wherein the predetermined sequence of symbols is determined algorithmically using a sequence object.

18. The computer program product of claim 15, wherein the predetermined sequence of symbols is divided into a two or more interleaved caches using an interleave rank value.

19. The computer program product of claim 15, wherein the predetermined sequence of symbols is assigned into a two or more interleaved caches uses a round-robin assignment.

20. The computer program product of claim 15, wherein storing the group of semaphores into a shared memory comprises storing two or more semaphores into contiguous bits in a machine word.

* * * * *